Jan. 22, 1963 J. M. NERVIK 3,075,046

TELEPHONE TRAFFIC DATA RECORDER

Filed July 31, 1959

INVENTOR
J. M. NERVIK
BY Kenneth B. Hamlin
ATTORNEY

United States Patent Office 3,075,046

Patented Jan. 22, 1963

3,075,046

TELEPHONE TRAFFIC DATA RECORDER

John M. Nervik, Parsippany, N.J., assignor to Bell Telephone Laboratories, Incorporated, New York, N.Y., a corporation of New York Filed July 31, 1959, Ser. No. 830,768
8 Claims. (Cl. 179—8)

This invention relates to the recording of digital information in electronic switching systems and more particularly to the recording of telephone traffic data.

The automatic accounting of telephone messages for billing and other purposes is a process which requires the storage of information commencing with the initiation of the call and terminating with the entry of the proper charges against the subscriber's account. Prior automatic message accounting systems have been developed in which a paper tape is punched on each of three occasions, viz., when the calling connection is made, when the called party answers and upon disconnect. On subsequent reading of the tape, it is necessary to provide apparatus for correlating the three entries to provide the accounting information necessary to completely describe the telephone call. The obvious mechanical limitations inherent in three-entry tape punching make desirable a single-entry recording system utilizing a recording medium which need not be stopped and started for each entry. However, the fluctuations in the volume of traffic data to be recorded over the course of a business day impose certain operating problems on the recording system. For example, if a conventional magnetic recording apparatus is used, thereby eliminating the need to stop the tape for punching, an inordinate amount of tape would be wasted by the constant speed drive during comparatively idle hours, and on the other hand, data would be unreadably crowded during comparatively busy hours.

Another problem is presented. In the conventional magnetic recording of digital data, it is customary to accumulate a block of data in a buffer memory, start the tape, record the data, and stop the tape. Thus, during comparatively idle hours the tape would have to be rapidly brought up to the synchronous speed from a standstill to record each of the infrequent entries, thereby necessitating a high performance tape drive mechanism. During somewhat more busy hours the more frequently presented blocks of data cause the duty cycle requirements placed upon the tape drive to become quite severe. On the other hand, running the tape continuously at the speed required to record maximum traffic while eliminating the duty cycle problem results in an extremely uneconomical use of tape.

Accordingly, it is an object of the present invention to effect an improvement in telephone traffic data recording.

It is another object of this invention to provide an efficient and inexpensive apparatus for assembled entry toll call recording.

In accordance with the principles of the present invention, in one illustrative embodiment thereof, the average rate at which telephone calls are handled by the central office switching system is measured and converted to an analog signal to control the speed of a magnetic tape drive. Accounting information, describing completed calls in digital form, is made available in a temporary memory register array and transferred to the magnetic tape via a recording control circuit so that the successive bits within an entry relating to a call will be evenly spaced on the tape and so that successive entries will be spaced to conserve tape regardless of the fluctuations in traffic encountered.

Accordingly, it is a feature of the present invention automatically to accumulate message accounting information during the continuance of a telephone call and selectively to record the accounting information at the termination of the call.

It is another feature of the present invention asynchronously to transfer data from a periodically accessible store to a tape in accordance with the average traffic being handled by the store.

It is still another feature of the present invention that the speed of a digital information recording tape be adjusted in accordance with the time average volume of the digital information to be recorded.

The foregoing and other objects and features may be more readily understood when read in conjunction with the following detailed specification and drawing in which.

Figures 1, 2:
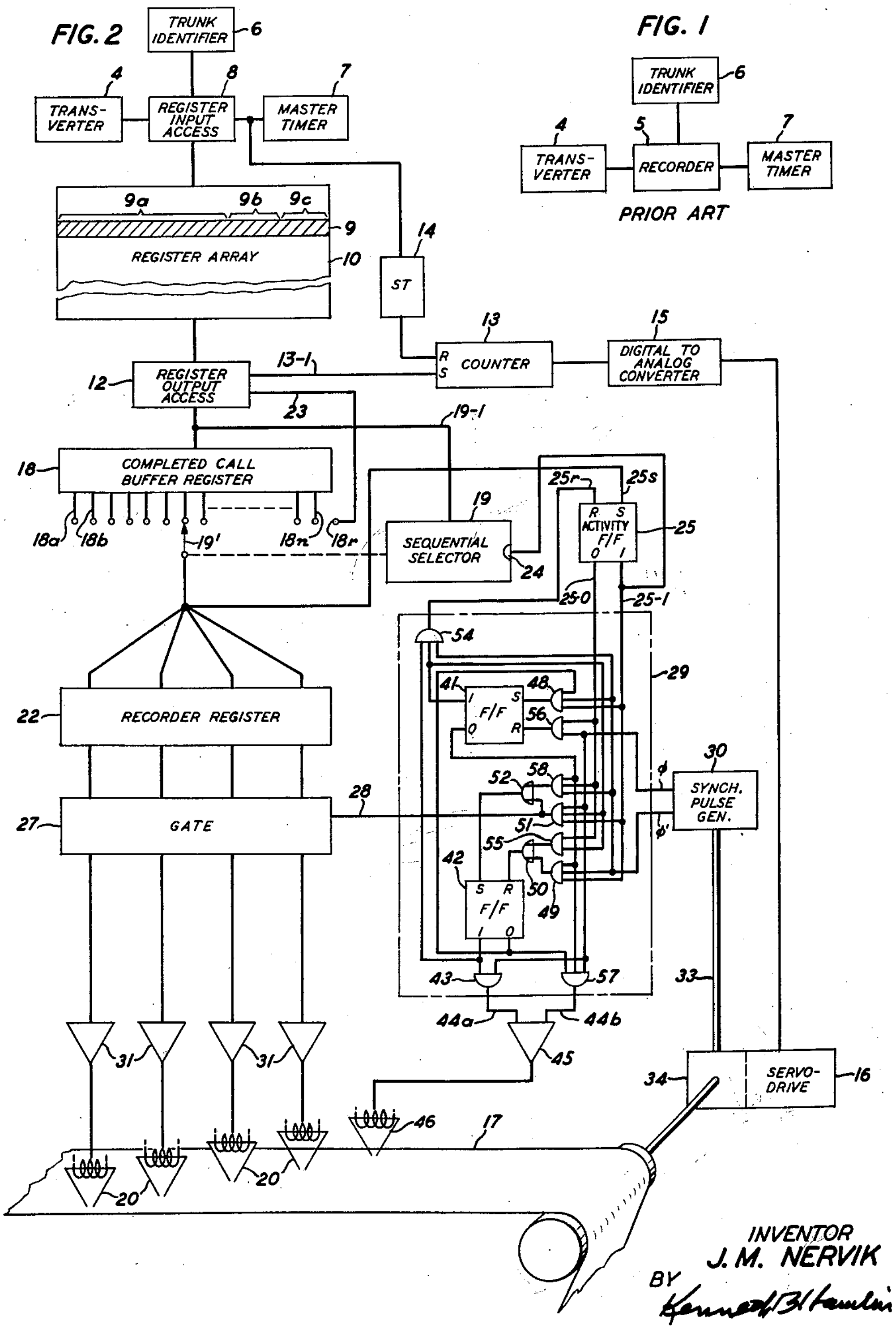
FIG. 1 shows a telephone traffic data recording system of the prior art.
FIG. 2 shows a telephone traffic data recording system in accordance with the present invention.

Referring now to FIG. 1, there is shown in simplified block diagram form a portion of a typical common control telephone traffic data recording system such as is described in FIGS. 65 to 67 of Patent No. 2,599,358, issued to Cahill, Carpenter and Dimond, on June 3, 1952. Briefly, the system of FIG. 1 functions to record three entries on a paper tape for each call. The initial entry includes the calling and called party directory numbers, the message billing index, and the call identity index. When the called party answers, a second entry is recorded consisting of the time of answer and the call identity index. The third entry, which is recorded on disconnect, consists of the time of disconnect and the call identity index. The transverter 4 supplies to recorder 5 the directory number of the calling and called parties and the message billing index. The trunk identifier 6 identifies the trunk over which the calling connection is made by supplying the call identity index, while master timer 7, which is connected to recorder 5 for the second and third entries, supplies timing information. Since entries relating to other calls being handled by the telephone system will generally be interspersed between the first and second and between the second and third entries relating to a specific call, it is necessary on a subsequent reading of the tape to provide apparatus for correlating the three entries of each completed call.

In FIG. 2, the transverter 4, trunk identifier 6 and master timer 7 perform the same functions as in FIG. 1, but the recorder 5 has been replaced by an improved magnetic recording and control apparatus. The information supplied by trunk identifier 6 and transverter 4 for the first entry relating to a particular telephone call is applied to a conventional register input access circuit 8 which enters the information supplied in an available register 9 of register array 10. Any well-known register array of sufficient capacity advantageously may be employed for the register array 10, the operation of such information storage arrays and access circuits being described in numerous articles and texts such as R. K. Richards' "Arithmetic Operations in Digital Computers" published by D. Van Nostrand Company, New York.

Accordingly, the initial entry of information comprising the calling and called party directory numbers, the message billing index and call identity index, which is presented to access circuit 8 by transverter 4 and trunk identifier 6, is caused to be entered by access circuit 8 in an idle register 9 of array 10. Since the initial entry, answer entry and disconnect entry pertaining to the same call have the same call identity index, access circuit 8 responds to this index in accordance with well-known addressing techniques to place the related entries in appropriate portions 9a, 9b and 9c of the same register 9 as the information is presented by transverter 4, trunk identifier 6 and master timer 7. Thus, the initial entry is recorded in portion 9a, the answer entry in 9b and the disconnect entry in 9c. In the interval between the entry of information in portions 9a and 9b of register 9, access circuit 8 typically may be called upon by transverter 4 and trunk identifier 6 to enter information relating to other calls in the coresponding portions of the other registers of register array 10 without disrupting the assemblage of information in register 9.

Thus far, the operation of FIG. 2 is similar to that of FIG. 1 with the exception that the call identity index is utilized by access circuit 8 to store each of the three entries relating to a particular telephone call in adjacent portions of a register rather than being randomly spaced on a paper tape. Depending upon the volume of traffic, one or more of the active registers in array 10 will contain completed call data, i.e., the portions of these registers assigned to initial entry, answer entry and disconnect entry will have been filled while others of the active registers in array 10 will contain data relating to calls in progress, i.e, only the initial or the initial and answer entry portions of these registers will have been filled. Register output access circuit 12, which similarly to input access circuit 8 is of conventional design, periodically scans array 10 to detect the presence of active registers. Each time an active register is detected by output access circuit 12 lead 13–1 is activated causing counter 13 to be incremented. Counter 13 is periodically reset to zero at appropriate intervals determined by time scaling circuit 14 which is connected to master timer 7. Counter 13 accordingly measures the number of calls in progress during the timing intervals supplied by circuit 14 and the count so tabulated, converted to an analog signal by converter 15, is applied to servodrive 16 to regulate the speed of the magnetic tape 17. Thus, the speed of tape movement is controlled by the average volume of traffic being handled by the telephone system. Access circuit 12 may be adjusted, in accordance with well-known techniques, to scan either the initial entry portion of register array 10 or the disconnect entry portion of array 10 to detect the presence of active registers. If the former method is utilized, the count accruing in counter 13 bears a statistical relationship, based on average call duration, to the amount of data to be recorded for a fair amount of time (of the order of minutes) into the future. On the other hand, scanning the disconnect entry portions of the array 10 will result in the accrual of the number in counter 13 which bears a statistical relationship to the amount of data to be recorded for only a short period of time into the future (of the order of seconds). Thus, the former scanning method is to be preferred where it is desired to utilize a more economical "low performance" servodrive 16 for tape 17 whereas the latter method dictates the use of a "high performance" servodrive 16 to keep pace with the more rapid variations in the number tabulated by counter 13.

Register output access circuit 12 in addition to scanning array 10 for active registers also scans the disconnect entry portions of array 10 for the purpose of transferring the completed call information from one filled register at a time into completed call buffer register 18. After each filled register such as 9 is read out, access circuit 12 "locks up" until released by activation of lead 23. Since the total number of bits contained in register 18 normally will exceed the number of bits which can conveniently be transferred at one time to the recording heads 20, sequential selector 19 is provided to selectively steer groups of as many bits as there are recording heads to recorder register 22. Since four recording heads are used, each group will consist of four bits, each of the contacts 18a–18n having access to the four bits of a group. When selector arm 19′ of selector 19 reaches contact 18r, access circuit release lead 23 is activated allowing access circuit 12 to fill register 18 with the completed call information contained in another of the registers of array 10. Simultaneously with the transferral of the new block of completed call data to registers 18, lead 19–1 is energized and selector 19 returns selector arm 19′ from contact 18r to transfer the group of bits at contact 18a to register 22.

With the speed of tape 17 controlled in accordance with the average number of calls being handled by the switching system to achieve uniform bit spacing on the tape as well as to prevent the loss of data, the transfer of groups of bits by sequential selector 19 must be regulated so that a new group of bits is not transferred to register 22 until the previous group has been recorded on the tape. This is accomplished by setting activity flip-flop 25 each time selector 19 is advanced from one to another of contacts 18a–18n. Lead 25s coupled to selector arm 19′ supplies terminal s of activity flip-flop 25 with the setting signal simultaneously with the transfer of the bits from register 18 to register 22. Set output lead 25–1 of activity flip-flop 25 maintains inhibit terminal 24 of sequential selector 19 energized until the bits previously stored in register 22 have been transferred to the tape at which time control circuit 29 energizes lead 25r to reset flip-flop 25. When flip-flop 25 is reset, lead 25–1 and inhibit terminal 24 are deenergized thereby enabling selector 19 to advance arm 19′ to the next successive one of the contacts 18a–18n.

The detailed circuitry shown within the recording control circuit 29 will now be described in conjunction with the transfer to tape sequence. Prior to the transfer of completed call data to register 18, activity flip-flop 25 will be in the reset condition maintaining lead 25–0 energized. Synch-pulse generator 30, driven by servodrive 16 via gear box 34 and coupling 33 alternately energizes recording phase lead $\varphi$ and shift phase lead $\varphi'$. Flip-flop 41 accordingly will be reset by the activation of "AND" gate 56 on the occurrence of the energization of lead $\varphi$. Upon the subsequent energization of lead $\varphi'$, flip-flop 42 will be set via "OR" gate 52 by the activation of "AND" gate 58. The three inputs of "AND" gate 58 being energized respectively by the reset output of flip-flop 41, the reset output lead 25–0 of activity flip-flop 25 and the shift phase pulse output on lead $\varphi'$ of synch-pulse generator 30. Accordingly, when no information is being recorded, flip-flip 41 will be in the reset state and flip-flop 42 will be in the set state. The next energization of lead $\varphi$ together with the set output of flip-flop 42 actuate "AND" gate 43 to energize lead 44a of synch-pulse recording amplifier 45. Energization of lead 44a causes amplifier 45 to activate recording head 46 to record a positive marker pulse in the sprocket channel of tape 17. The positive marker pulses are recorded at evenly spaced intervals on tape 17 by the successive energizations of lead $\varphi$ regardless of tape speed because both the tape 17 and synch-pulse generator 30 are controlled by servodrive 16. The marker pulses in the sprocket channel serve the purpose, upon subsequent reading of the tape, of providing means by which the locations of the data pulses to be recorded by heads 20 may be indexed.

On the other hand, it is possible, by the use of a tape 17 which has an entirely different set of marker pulses prerecorded in a separate sprocket channel to develop, by means of a separate reading head and amplifier (not shown), recording phase and shift phase pulses synchronized to tape speed similar to those produced on leads $\varphi$ and $\varphi'$ by synch-pulse generator 30. The use of a geared synch-pulse generator rather than the sensing of prerecorded sprocket channel signals is preferred in this embodiment for control of circuit 29 because tape speed for economical recording during non-busy hours may be lower than that at which the prerecorded sprocket channel signals may be effectively read, whereas the use of a geared synch-pulse generator places no lower limit on tape speed.

Upon the transfer of a block of data to register 18, sequential selector 19 will bring arm 19′ into connection with contact 18a and the first four bits will be entered in recorder register 22. Simultaneously, lead 25s will be energized to set flip-flop 25 and inhibit terminal 24 of selector 19 will be activated by energization of the set output lead 25–1 of flip-flop 25. Since there is necessarily no direct relationship between the moment at which lead 25–1 becomes energized and the phase of synch-pulse generator 30, either the $\varphi$ or $\varphi'$ leads may be energized simultaneously with the energization of lead 25–1 or immediately thereafter. Assuming the $\varphi$ lead to be energized with or following the energization of lead 25–1, and recalling that flip-flop 41 is reset and that flip-flop 42 is set, the status of control circuit 29 will remain unchanged. However, on the ensuing energization of lead $\varphi'$ "AND" gate 49 will be actuated by the reset output of flip-flop 41 and the set output lead 25–1 of flip-flop 25. The actuation of "AND" gate 49 resets flip-flop 42 via "OR" gate 50. The reset output of flip-flop 42 together with the energized state of leads $\varphi'$ and 25–1 actuate "AND" gate 48 to set flip-flop 41. When lead $\varphi$ is subsequently energized, "AND" gate 51 is actuated by the set outputs of flip-flop 41 and flip-flop 25 to energize recording lead 28 and set flip-flop 42 via "OR" gate 52. Energization of lead 28 transfers the information bits stored in recorder register 22 via recording amplifiers 31 to the recording heads 20. Simultaneously therewith, "AND" gate 43 is enabled by the set output of flip-flop 42 and then energized state of lead $\varphi$ to cause a positive clock pulse to be recorded by head 46. When lead $\varphi'$ is next energized, "AND" gate 54 is actuated by the set outputs of flip-flops 41 and 42 and lead 25*r* is energized to reset activity flip-flop 25. "AND" gate 55 is actuated by the reset output of flip-flop 25 and the set output of flip-flop 41 and gate 55 resets flip-flop 42 via "OR" gate 50.

Thus, the first four information bits in buffer register 18 have been transferred to the tape and flip-flops 41 and 42 are in the set and reset states, respectively. Since activity flip-flop 25 has been reset by the recording control circuit 29, inhibit terminal 24 is deenergized and sequential selector 19 advances selector arm 19′ to the next contact 18*b* whereupon the next four bits will be entered in register 22. Simultaneously with the entry of the bits in register 22, activity flip-flop 25 is set and the circuit is ready to record on the next energization of lead $\varphi$.

The successive entry of four bit groups from buffer register 18 to recorder reigster 22 and the subsequent transferral of the four bits to the tape, continue until buffer register 18 has been emptied. On the shift phase following the recording of the four bits taken from contact 18*n*, "AND" gate 54 will be actuated just as it was actuated on previous shift phases following the recording of data and activity flip-flop 25 will accordingly be reset. With activity flip-flop 25 reset, inhibit terminal 24 will again be deenergized and selector 19 will cause arm 19′ to advance to contact 18*r*. However, the connection of arm 19′ with contact 18*r* transfers no data from register 18 to register 22 and so lead 25*s* will not be energized and accordingly activity flip-flop 25 will remain in the reset state. Upon the subsequent energization of lead $\varphi$, "AND" gate 56 will be actuated by the reset output of flip-flop 25 and flip-flop 41 will be reset. "AND" gate 57 will be actuated by the reset output of flip-flops 41 and 42 and the energized state of lead $\varphi$. Actuation of gate 57 energizes lead 44*b* causing amplifier 45 to operate head 46 to record a negative marker pulse indicating the end of recorded block of data describing a completed call.

If upon the ensuing energization of lead $\varphi'$, another block of data had been entered in register 18, flip-flop 25 would be set and flip-flop 41 will be set by actuation of "AND" gate 48. Flip-flop 41 being in the set state on the next energization of lead $\varphi$, recording of the first four bits of the second data block will take place in similar fashion to the recording of the bits of the first data block described above.

On the other hand, if no completed call data had been entered in register 18 upon the ensuing energization of lead $\varphi$, "AND" gate 58 would be actuated by the reset outputs of flip-flops 41 and 25 causing flip-flop 42 to be set. Thus, flip-flops 41 and 42 being in the reset and set states, respectively, head 46 will be energized to record positive marker pulses in the sprocket channel of tape 17 on each energization of lead $\varphi$. Upon subsequent transfer of completed call data to register 18, the circuit will again commence data recording as described above.

It is to be understood that the above-described arrangements are illustrative of the application of the principles of the invention. Numerous other arrangements may be devised by those skilled in the art without departing from the spirit and scope of the invention.

What is claimed is:

1. A traffic data recording system comprising a source of traffic data signals, periodically timed traffic volume counting means coupled to said source, magnetic tape access means including a tape drive and means for recording said signals on said tape, means including said counting means for controlling the speed of said tape drive, buffer register means controlled in accordance with the speed of said tape for storing said signals, and means for selectively controlling said access means to transfer said traffic data signals to said tape in correspondence with the counts periodically accruing in said periodically timed traffic volume counting means, said selectively controlling means including a source of pulses synchronized with said tape drive and bistable state switching means for inhibiting said transfer between successive ones of said synchronized pulses.

2. An automatic message counting recording system comprising a register array for storing message accounting data accruing during the continuance of any of a plurality of telephone calls, means for determining the average accrual rate of said data in said register array, magnetic tape access means including a magnetic tape drive, a buffer register and a plurality of magnetic recording circuits, means for selectively transferring said message accounting data to said buffer register at the completion of a telephone call, and means controlled by said accrual rate determining means for regulating the transfer of said data from said buffer register to said recording circuits.

3. An automatic message accounting recording system in accordance with claim 2 wherein the speed of said magnetic tape drive is regulated according to said average accrual rate of said data in said register array.

4. In a data recording system wherein the quantity of data to be recorded fluctuates at random, the combination comprising register means, means for entering said data in said register means, determining means for determining the rate at which said data is entered in said register means, a continuously movable recording medium, recording means for recording manifestations of said data on said medium, transfer means including said recording means for transferring data from said register means to said medium, means operative during the continuance of said data transferring and controlled by said determining means for controlling the rate of movement of said medium, and means controlled by said determining means for controlling the rate at which said data is transferred from said register means to said medium.

5. In a system for recording a randomly varying number of multibit data blocks, the combination comprising register means, means for entering said blocks in said register means, counting means for determining the number of said blocks periodically accruing in said register means, a continuously movable recording medium, a plurality of recording circuits for recording said data on said medium, said plurality being smaller than the number of bits in said blocks, selector means for sequentially steering groups of said plurality of bits from said register to said circuits, means coupled to said counting means and responsive to said number counted for controlling said selector means, said means for controlling said selector means including bistable state switching means coupled to said register for blocking said selector, and means coupled to said counting means and responsive to the number counted for generating periodic pulses to unblock said selector.

6. In a system for recording a randomly varying number of multibit data blocks according to claim 5 the combination comprising drive means coupled to said counting means for moving said recording medium at a rate determined by said number counted.

7. An automatic traffic data recording system comprising a source of traffic data signals, a traffic data register, register input access means coupled to said source for assembling in said register related items of said data, said source of traffic data signals supplying said items of data individual to different telephone calls on a substantially random basis, variable rate data recording means, register output access means including a first scanning circuit and counting means for determining the number of said items of said traffic data individual to said different ones of said calls periodically accruing in said register, said output access means further including a second scanning circuit for transferring assembled ones of said related traffic data items to said recording means, and means controlled by said counting means for adjusting the recording rate of said recording means in accordance with said periodically accruing number.

8. Apparatus for recording telephone central office traffic data comprising a register array including a plurality of registers for storing information individual to successive telephone calls made through said central office during the continuance of each of said calls, means for scanning said array to determine the number of said registers containing said information individual to any of said telephone calls, scanning timer means, means coupled to said scanning means and to said scanning timer means to generate a signal representing the rate of accrual of said information individual to said telephone calls in said array, a magentic tape, means for driving said magnetic tape, means for applying said accrual rate representing signal to said magnetic tape driving means to control the speed of said tape, buffer register means controlled by said scanning means for receiving said telephone call information individual to only one of said calls, said scanning means thereupon inhibiting the transfer of said information individual to any telephone call of said buffer means, recorder register means, a plurality of simultaneously operable recording means associated with said magnetic tape, each of said recording means being associated with a corresponding portion of said recorder register means, means controlled by said tape driving means for selectively coupling said buffer register with said recorder register and said recording means, and means for cancelling said scanning means inhibiting.

References Cited in the file of this patent

UNITED STATES PATENTS

| | | |
|---|---|---|
| 2,599,358 | Cahill et al. | June 3, 1952 |
| 2,784,049 | Mitchell et al. | Mar. 5, 1957 |
| 2,814,676 | House | Nov. 26, 1957 |
| 2,914,619 | Sweeney et al. | Nov. 26, 1959 |
| 2,931,689 | Dupy | Apr. 5, 1960 |
| 2,976,365 | Young | Mar. 21, 1961 |